(12) United States Patent
Loach

(10) Patent No.: US 10,103,985 B2
(45) Date of Patent: Oct. 16, 2018

(54) SYSTEM AND METHOD FOR ANALYZING DEVICES ACCESSING A NETWORK

(71) Applicant: SANDVINE INCORPORATED ULC, Waterloo (CA)

(72) Inventor: Scot Loach, Waterloo (CA)

(73) Assignee: SANDVINE INCORPORATED ULC, Waterloo (CA)

( * ) Notice: Subject to any disclaimer, the term of this patent is extended or adjusted under 35 U.S.C. 154(b) by 0 days.

(21) Appl. No.: 15/455,697

(22) Filed: Mar. 10, 2017

(65) Prior Publication Data

US 2017/0187618 A1 Jun. 29, 2017

Related U.S. Application Data

(63) Continuation of application No. 14/135,994, filed on Dec. 20, 2013, now Pat. No. 9,608,904.

(51) Int. Cl.
H04L 12/741 (2013.01)
H04L 29/06 (2006.01)
H04L 12/26 (2006.01)

(52) U.S. Cl.
CPC ............ H04L 45/74 (2013.01); H04L 43/04 (2013.01); H04L 69/167 (2013.01)

(58) Field of Classification Search
CPC ..... H04L 43/00; H04L 67/22; H04L 43/0876; H04L 12/605; H04L 29/0653; H04L 29/08009; H04L 370/349; H04L 29/12358; H04L 29/06142; H04L 69/12; H04L 69/161; H04L 69/32; H04L 69/22; H04L 61/6086; G06F 11/30; G06F 11/34; G06F 370/245; G06F 370/252; G06F 370/253; H04W 80/045

USPC ......................................................... 370/241
See application file for complete search history.

(56) References Cited

U.S. PATENT DOCUMENTS 6,760,749 B1 7/2004 Dunlap et al.
6,952,428 B1 10/2005 Necka et al.
7,644,150 B1 1/2010 Nucci et al.
7,657,628 B1 * 2/2010 McDysan ........... G06F 11/2028
370/401

(Continued)

FOREIGN PATENT DOCUMENTS

WO 2010041784 4/2010

OTHER PUBLICATIONS

European Patent Office, Examination Report on European Patent App. No. 14166806.1, dated Jun. 21, 2017.

(Continued)

*Primary Examiner* — Wutchung Chu

(57) ABSTRACT

A method and system for analyzing devices on a network are provided. The method includes: receiving at least one packet from a Customer Premises Equipment (CPE); determining identity metadata associated with the at least one packet; and analyzing the at least one packet to determine a device associated with the at least one packet. The system for analyzing devices on a network includes: a packet processor configured to receive at least one packet from a CPE; a subscriber/session identity module configured to determine identity metadata with the at least one packet; and a device tracker module configured to analyze the at least one packet to determine a device associated with the at least one packet.

18 Claims, 9 Drawing Sheets

(56) References Cited

U.S. PATENT DOCUMENTS

| | | | |
|---|---|---|---|
| 9,015,327 B2* | 4/2015 | Naidu | H04L 65/1016 709/227 |
| 2004/0130580 A1 | 7/2004 | Howard et al. | |
| 2005/0080888 A1 | 4/2005 | Walter | |
| 2005/0091388 A1 | 4/2005 | Kamboh et al. | |
| 2005/0138192 A1 | 6/2005 | Encarnacion et al. | |
| 2007/0206633 A1 | 9/2007 | Melamed et al. | |
| 2008/0253548 A1 | 10/2008 | Mahalingam | |
| 2008/0262991 A1 | 10/2008 | Kapoor et al. | |
| 2009/0006659 A1 | 1/2009 | Collins et al. | |
| 2009/0059957 A1 | 3/2009 | Bagepalli et al. | |
| 2009/0067441 A1 | 3/2009 | Ansari et al. | |
| 2009/0133079 A1 | 5/2009 | Li et al. | |
| 2009/0182864 A1 | 7/2009 | Khan et al. | |
| 2009/0225671 A1 | 9/2009 | Arbel et al. | |
| 2009/0290492 A1* | 11/2009 | Wood | H04L 63/1416 370/235 |
| 2011/0182183 A1* | 7/2011 | Perkins | H04L 29/12066 370/235 |
| 2011/0213869 A1 | 9/2011 | Korsunsky et al. | |
| 2011/0307953 A1 | 12/2011 | Kruglick | |
| 2012/0137162 A1 | 5/2012 | Huang et al. | |
| 2012/0167162 A1* | 6/2012 | Raleigh | G06F 21/57 726/1 |
| 2012/0170470 A1 | 7/2012 | Duchenay et al. | |
| 2012/0314617 A1 | 12/2012 | Erichsen et al. | |
| 2013/0024901 A1 | 1/2013 | Sharif-Ahmadi et al. | |
| 2013/0201316 A1 | 8/2013 | Binder et al. | |
| 2013/0227166 A1 | 8/2013 | Ravindran et al. | |
| 2013/0246431 A1 | 9/2013 | Ahuja et al. | |
| 2013/0262656 A1 | 10/2013 | Cao et al. | |
| 2014/0149569 A1 | 5/2014 | Wittenstein et al. | |
| 2014/0189861 A1 | 7/2014 | Gupta et al. | |
| 2014/0280822 A1 | 9/2014 | Chennimalai Sankaran et al. | |
| 2015/0016249 A1 | 1/2015 | Mukundan et al. | |
| 2015/0066979 A1 | 3/2015 | Zhang et al. | |
| 2015/0296445 A1 | 10/2015 | Zhou et al. | |

OTHER PUBLICATIONS

Marten et al., "Privacy Extensions for Stateless Address Autoconfiguration in IPv6", Network Working Group Request for Comments: 4941, Standards Track, Sep. 2007.

Tekeoglu et al., "Approximating the Number of Active Nodes Behind a NAT Device", Computer Communications and Networks (ICCCN), 2011 Proceedings of 20th International Conference, Jul. 31, 2011, Jul. 31, 2011-Aug. 4, 2011.

European Patent Office, Extended European Search Report for EP Appln. No. 14166806.1, dated Jun. 26, 2014.

European Patent Office, Examination Report on EP Appln. No. 14166806.1, dated Aug. 16, 2016.

United States Patent and Trademark Office, Office Action on U.S. Appl. No. 14/135,994, dated Dec. 16, 2015.

United States Patent and Trademark Office, Final Office Action on U.S. Appl. No. 14/135,994, dated Jun. 21, 2016.

United States Patent and Trademark Office, Notice of Allowance on U.S. Appl. No. 14/135,994, dated Nov. 14, 2016.

* cited by examiner

SYSTEM AND METHOD FOR ANALYZING DEVICES ACCESSING A NETWORK

CROSS-REFERENCE TO RELATED APPLICATIONS

This application is a continuation of U.S. patent application Ser. No. 14/135,994, filed Dec. 20, 2013, which is hereby incorporated in full by reference.

FIELD

The present disclosure relates generally to networking. More particularly, the present disclosure relates to a system and method for analyzing devices accessing a network.

BACKGROUND

A network provider, such as an Internet Service Provider (ISP), operates a network that delivers Internet connectivity to subscribers. A general model of the network of an ISP consists of a core network and an access network. A subscriber pays an ISP for network connectivity and the subscriber has a Customer-Premises Equipment (CPE) such as a modem or a mobile phone that may be provided by the ISP or by the subscriber. The CPE connects to the access network and exchanges traffic with hosts on the Internet. This traffic is routed through the core network to other networks which collectively make up the Internet. The ISP that sells Internet access to the subscriber may not own or operate the access network; the ISP may be reselling an access network owned by another company. Generally, when a subscriber wants to use the network, the CPE must first establish a session with the access network. As a result of establishing a session, a CPE may be provided with an IPv4 address and/or an IPv6 prefix for the session.

In an IPv4 network, the CPE is provided a single IP address for the network session. However, it is common for a subscriber to have a plurality of network-capable devices that may use the network concurrently. This situation is especially common in fixed-line networks such as Cable and DSL networks, where a subscriber represents an entire household, connected to the access network by a modem. In this case, multiple family members may be using different devices at the same time and other household devices such as alarm systems, TVs, and the like, may be automatically communicating with hosts on the Internet. Multiple devices share a single IPv4 address using a technology called network address translation (NAT), or network address port translation (NAPT).

In this example, the CPE owns or manages the IP address assigned for the session. Typically, the CPE is a router or a Wi-Fi access point that provides network access to other network capable devices. In a fixed-line network, the CPE is generally a network router. In a mobile network, the CPE is generally a mobile handset, such as a phone, a wireless modem, a MiFi device or the like. The CPE provides a private IP address to each device connected to the CPE. The CPE translates each packet sent by a connected device by replacing the device's private source IP address with the IP address of the session and, in some cases, replacing the source port of the packet. The CPE translates each packet sent from the Internet by replacing the destination IP address of the packet with the private IP address of a connected device and, in some cases, replacing the destination port of the packet.

In an IPv6 network, the CPE is provided with an IP prefix. The CPE uses this IP prefix to give each connected device its own IP address or smaller IP prefix, and NAT or NAPT may not be required. If a connected device is provided with an IP prefix, the connected device may change its IP address at any time; this address is called a temporary address and is often done for reasons of privacy. In an IPv6 network, the CPE forwards packets between connected devices and the Internet, based on the destination IP address of each packet.

It is common for a network to support both IPv4 and IPv6 addresses; this is known as a dual-stack network. Many devices have the ability to be assigned both an IPv4 address and an IPv6 address; these are known as dual-stack devices. Having both IP addresses is useful because some Internet hosts work with IPv4 and others work with IPv6; so to have full Internet connectivity in today's Internet as it continues migrating to IPv6, dual-stack networking is needed. There are also IPv6 transition mechanisms that may be used. Generally these mechanisms result in IPv4 traffic being tunneled inside IPv6 traffic between the CPE and a tunnel endpoint in the access network.

In a simple model of a network, the ISP provides basic Internet connectivity, which means the ISP routes each packet from a CPE to the Internet based on the packet's destination IP address. Further, the ISP routes each packet from the Internet to a CPE based on its destination IP address. Generally, the ISP may only know what IPv4 address and/or IPv6 prefix is assigned to each CPE. However, there are several reasons why an ISP may want to know more information about the devices being used to access the Internet, such as how many devices are being used, when and for how long various devices are being used, and how much traffic is being used by different types of devices.

It is, therefore, desirable to provide a system and method for analyzing devices on a network.

SUMMARY

In a first aspect, the present disclosure provides a method for analyzing devices on a network including: receiving at least one packet from a Customer Premises Equipment (CPE); determining identity metadata associated with the at least one packet; and analyzing the at least one packet to determine a device associated with the at least one packet.

In a particular case, the method may further include: determining session data and subscriber data related to the at least one packet; and updating a count of devices in use related to the session and associated with the subscriber.

In another particular case, the method may further include determining device metadata related to the device associated with the at least one packet.

In still another particular case, determining device metadata related to the device may include identifying the device; and classifying the device based on the device identity.

In yet another particular case, analyzing the at least one packet to determine a device associated with the at least one packet may include accounting the at least one packet to the device.

In still yet another particular case, the method may include enforcing policy rules in real-time based on the identity metadata and device.

In a particular case, analyzing the at least one packet to determine a device associated with the at least one packet may include determining whether the device is a dual-stack device and associating the at least one packet associated with the dual-stack device to a Device ID.

In another particular case, the at least one packet may include a plurality of packets.

In still another particular case, analyzing the plurality of packets to determine a device associated with the plurality of packets further includes determining a plurality of IP addresses associated with a single device.

In yet another particular case, analyzing the plurality of packets may include performing Layer 7 correlation procedures on each packet.

In still yet another particular case, the Layer 7 correlation procedures may be selected from the group of node pair correlation, signaled data correlation and application field correlation.

In a particular case, analyzing the plurality of packets may include performing device matching processes on each packet.

In another particular case, the method may include determining the state of the device.

In still another particular case, the method may include: initiating an idle timer and a timeout timer for the device; updating the state of the device to idle if the idle timer reaches a threshold; and updating the state of the device to deleted if the timeout timer reaches a threshold, otherwise returning the state of the device to active.

In further aspect, the present disclosure provides a system for analyzing devices on a network including: a packet processor configured to receive at least one packet from a Customer Premises Equipment (CPE); a subscriber/session identity module configured to determine identity metadata with the at least one packet; and a device tracker module configured to analyze the at least one packet to determine a device associated with the at least one packet.

In a particular case, the subscriber/session identity module may be further configured to determine session data and subscriber data related to the at least one packet; and the device tracker module may be further configured to update a count of devices in use within the session and associated with the subscriber.

In another particular case, the system may further include a device classification module configured to determine device metadata related to the device associated with the at least one packet.

In still another particular case, the device tracker module may be further configured to account the at least one packet to the device.

In yet another particular case, the system may include a policy module configured to enforce policy rules in real-time based on the identity metadata and device.

In still yet another particular case, the device tracker module may be further configured to determine whether the device is a dual-stack device and associating the at least one packet associated with the dual-stack device to a Device Id.

In another particular case, the device tracker module may be further configured to determine a plurality of IP addresses associated with a single device.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Figure 1:
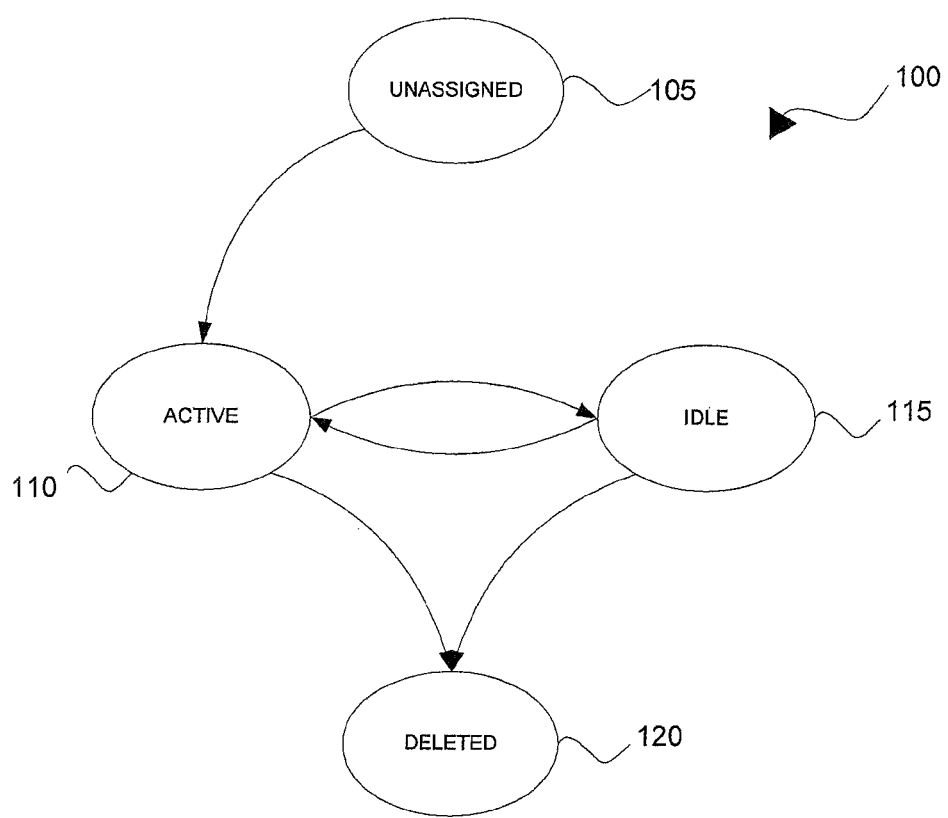
FIG. 1 illustrates a life cycle of a Device ID according to an embodiment.

Generally, the present disclosure provides embodiments of a method and system for analyzing devices on a computer network. In particular, analyzing devices is intended to include, for example, identifying, classifying and managing devices and the like. In embodiments of the method, identity metadata is retrieved as part of the analysis. Identity metadata is data that describes information about a subscriber and the subscriber's network session, such as the IP addresses assigned to the session; additional qualifiers for the IP address, such as a VLAN, a MPLS tag, a sequence of port numbers, or the like; a unique identifier for the session; a unique identifier for the subscriber; and additional attributes of the subscriber and session, such as the location of the subscriber, the network access point being connected to, the subscriber's plan, or the like. Further, the embodiments of the system and method described herein may also retrieve device metadata. Device metadata is data that describes information about a device, such as the manufacturer and model of the device, the operating system and operating system version, a unique identifier for the device, and other capabilities or attributes of the device.

There is a desire for network providers or others to analyze, identify, classify and manage the various devices accessing a computer network. For example, an ISP may want to keep track of metrics about device usage within the home at different times of the day and be able to see how this is trending over time, in order to understand different subscriber segments or personas for marketing purposes. In another example, an ISP may want to understand the relationship between concurrent device usage and quality of experience, so the ISP can plan future network expansion based on the trend of device usage. In yet another example, an ISP may want to understand which devices are used for different types of content, so the ISP can test their network with the devices being used. In still another example, an ISP may want to know the correlation between number of devices used in the home and subscribers' monthly usage, so that the ISP can suggest different service plans to subscribers based on the number of devices the ISP expects the subscribers to use. In still yet another example, an ISP may want to offer different service plans that enforce a quota on the number of devices used in the home or the number of devices of certain types used in the home.

Further, an ISP may want to provide free usage for particular devices; for example, the ISP may partner with a TV manufacturer and any usage from that manufacturer's brand of TV would not be charged. In an example, an ISP may want to charge different rates for usage from different devices. In another example, an ISP may want to identify subscribers that are violating terms of service related to number of devices; for example, as a way to identify subscribers who may be illegally reselling their Internet access. In yet another example, an ISP may want to identify subscribers who may be running a business using a residential Internet subscription by identifying large numbers of PCs operating in the subscriber's session. In still another example, an ISP may want to see which devices are active on the network and what the devices are currently doing to help with real-time troubleshooting of customer issues. In still yet another example, an ISP may want to identify which subscribers are using their mobile device as a Wi-Fi hotspot, to ensure the subscribers are within the terms of service of their plan. In another example, an ISP may offer a service to business customers, which allows the business customers to control which devices may access the Internet, to help corporate IT departments secure their networks.

The examples described above may entail the ability to count the number of devices in use within a session over time, identify and classify each device, account network traffic to each device, and enforce policy such as limiting the number of concurrent devices allowed to use the network. It will be understood that retrieving this information requires some access in the network, as the ISP generally does not have the access or ability to get this data from Customer Premises equipment (CPE) nor from the Internet servers being accessed by the subscribers. Embodiments of the method and system describe herein are intended to retrieve the data in real-time. Real-time retrieval can be important since it may not be practical to store all network traffic for post-analysis or to enable real-time policy enforcement. Retrieving the data in real-time may be a challenge, since within the IPv4 network, only a single IP address is seen for a session and there is no explicit indication of which device a packet is associated with. Therefore, it is intended that embodiments of the method and system described herein are intended to count the number of devices in use within a session, and identify and classify each device, and account for the network traffic for each device, in the network, in real-time.

Although there are known solutions to the basic problem of counting devices, merely counting devices will not fully satisfy the requirements for the described use cases above. Generally, the current literature does not consider how to manage the detection of when a device is no longer being used or how to manage the state of current devices to keep an accurate real-time count of devices in use while maintaining enough information to recognize the same device when that device comes back online. Generally, the known counting methods do not describe how to handle IPv6, specifically the problem of a dual-stack network, where devices may have a single IP address or may be dual-stack (and have two IP addresses). Properly counting devices in a dual-stack network introduces significant complexity to counting devices.

Similarly, it is possible for a device to have multiple IPv4 or IPv6 addresses due to Multipath TCP. In this case, the device establishes a session to more than one network, so the device will have an IP address on each network. Traffic is balanced across all of the networks.

Further, many counting methods do not contemplate how to account traffic to the proper device when that traffic is not handled by one of the known device counting techniques; for example, if a TCP Timestamp method is being used, there is no known method for counting UDP traffic to one of the counted devices. The literature is generally focused on counting devices and does not consider accounting traffic to a device, nor how a device can be classified and characterized, so that as much information as possible is known about the device. Traditional methods also generally assume that an IPv4 address is uniquely assigned to a CPE; however, in modern networks that are transitioning to IPv6, it is possible for multiple CPEs to be assigned the same IPv4 address and include some other information to distinguish these CPEs on the network.

One option may to be to obtain accounting information directly from the CPE; for example, some CPEs use an Application Programming Interface (API), such as TR-069 to provide usage data to the ISP. However, it is common for users to provide their own CPE router rather than using one provided by the ISP, or to otherwise disable the CPE from sending this type of information to the ISP. Further, a CPE that can do accounting does not satisfy the use cases of being able to enforce device-based network policy in real time.

Embodiments of the method and system described herein use various techniques as a basis for tracking multiple devices behind a CPE in real-time. Further, embodiments of the method and system described herein are intended to address the use cases outlined above by counting devices in use within a session over time, identifying and classifying each device, accounting network traffic to each device, and/or enforcing policy in real-time.

FIG. 1 illustrates an example life cycle 100 of a Device ID according to an embodiment. A Device ID represents a grouping of packets that are all transmitted or received by a single connected device on a network, where the connected device is the end host sending or receiving a packet. The connected device differs from a CPE, which may not be the end host for a packet, but is responsible for routing packets to and from end hosts.

The Device ID is created by a method for analyzing device accessing a network as described herein. When a Device ID is created, the Device ID is in the Unassigned state 105. In the Unassigned state 105, a Device ID is recognized to exist, but it is not yet known whether the Device ID represents a unique device, or whether there are a plurality of Device IDs that exists for the same device.

The Device ID may start in the Unassigned state and until the device is in an Active state the Unassigned Device ID may be replaced by a different Device ID. In the Unassigned state the method has not yet determined whether the Device ID represents a new device or a device that is already known by the embodiments of the system and method detailed herein.

When the Device ID transitions to the Active state 110, the Active Device ID represents a specific instance of a device, and the Active Device ID may be counted as a connected device on the network. When the Device ID transitions to the Idle state 115, the associated device has not been active on the network for a predetermined amount of time or predetermined threshold; this is called the idle timeout. In some cases, when the Device ID transitions to the Active state an idle timer will be triggered to track the time since the device has last been Active. A Device ID may transition from Active to Idle after the predetermined threshold, for example, 1 minute, 5 minutes, 1 hour, or the like. In some cases, the Device ID may transition when the timer reaches the predetermined threshold. The predetermined threshold may vary depending on the type of device associated with the Device ID.

In some cases, an idle device is not counted as a connected device, but any Device ID data, for example, device metadata, associated and stored for the Device ID may be maintained during the idle state, in case the device becomes active again and is transitioned back to the Active state 110. The device state data may be maintained for a second predetermined amount of time or predetermined threshold, referred to as a state timeout. The state timeout may be, for example, 5 minutes, 1 hour, 2 hours, 12 hours, or the like and may be tracked by a second timer, for example, a timeout timer. If the device is active on the network again before the state timeout or before the timeout timer reaches the predetermined threshold, the Device ID transitions back to the Active state 110. A Device ID may transition to the Deleted state 120 when the Device ID has been Idle for the duration of the state timeout or when the timeout timer reaches the predetermined threshold, when a session ends, or for other reasons where the device's state should no longer be maintained. A Device ID may transition to the Deleted State 120 from the Active state 110 if the session ends prior to the Device ID transitioning to the Idle state 115.

Figure 2:
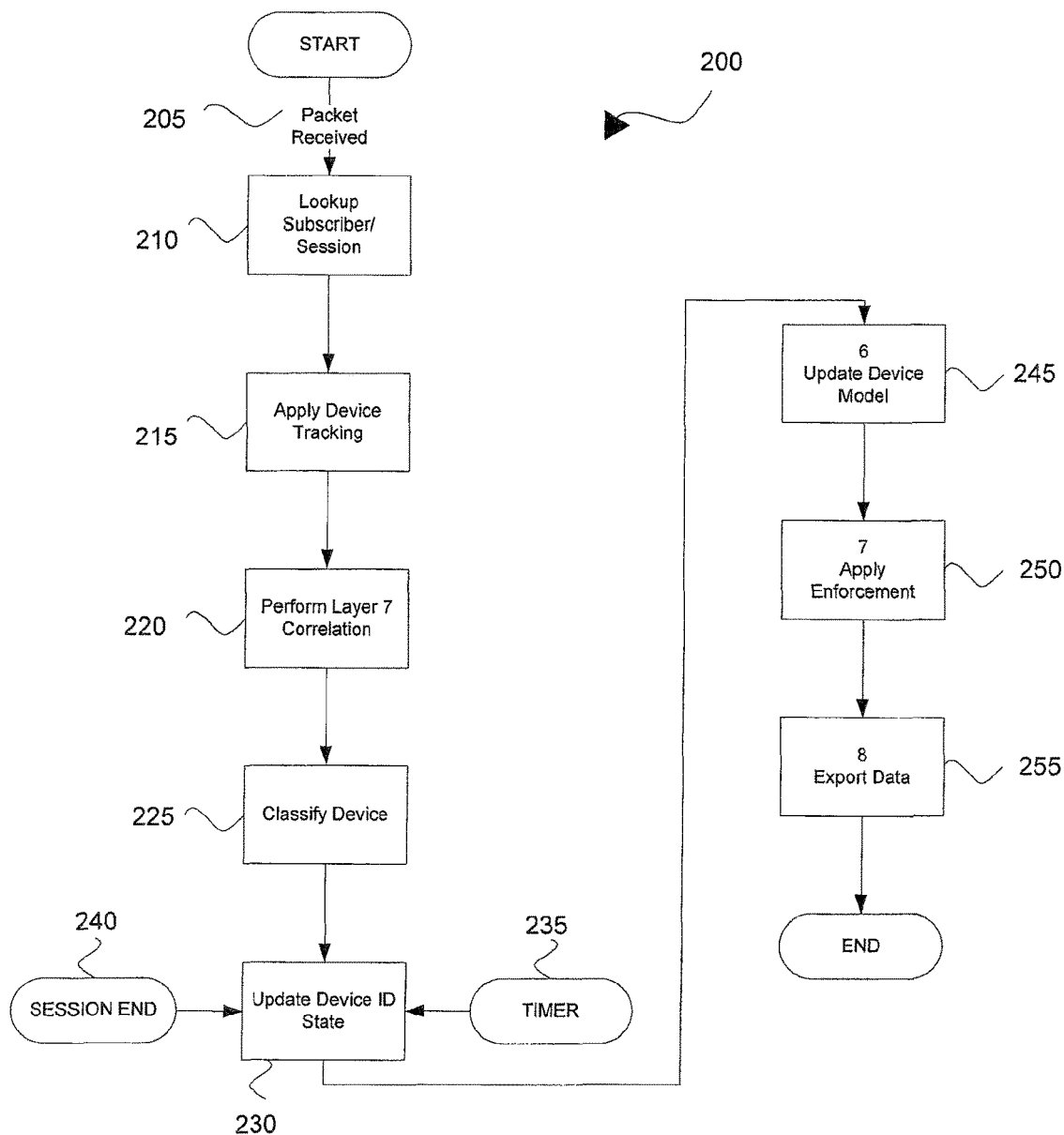
FIG. 2 is a flowchart of an embodiment of a method for analyzing devices on a network.

FIG. 2 illustrates a method 200 for analyzing devices on a network according to an embodiment. In some cases, the method 200 may be executed every time a packet is received from the network while in other cases, the method 200 may be executed only at predetermined times, based on characteristics of data flow, or the like.

At 205, a packet is received from a network, for example a core network or an access network. At 210, a lookup is performed. If the packet originated from a CPE, the source IP address of the packet is looked up in a subscriber management repository. If the packet is addressed to a subscriber, the destination IP address of the packet is looked up in the subscriber management repository. The lookup is intended to allow identity metadata to be associated with the packet. The identity metadata is made available and is associated with the packet.

In some cases, the subscriber management repository may be an external system that can be queried, such as a Dynamic Host Configuration Protocol (DHCP) server that can be queried with a DHCP Lease Query or a Subscriber Profile Repository that can be queried with a Lightweight Directory Access Protocol (LDAP) query, or the like. In other cases, the subscriber management repository may be a custom implementation that may use the IP address of the packet as the subscriber identity. A query may not be required for every packet. In some cases, the subscriber and session information may be stored locally and may be associated with the IP 5-tuple or the IP address of the CPE. In an embodiment, the access network is configured such that multiple sessions are assigned the same public IPv4 address, and a session qualifier is used along with the IP address to determine the session of a packet, for example the session qualifier may be a source port range, a VLAN, or the like.

At 215, an embodiment of a device tracking method is applied to the packet. The device tracking method is intended to derive a Device ID for the packet by performing analyses of the layer 3 and layer 4 headers of the packet, for example, by performing a sequence of matching processes or the like. If a matching process finds a Device ID for the packet, the packet may continue to be evaluated by the other matching processes, since it is possible for a packet to be matched by a plurality of the matching processes. Each matching process may update a Device ID data when the process matches a packet.

In an embodiment, the inner packet of an IPv4 tunnel is first extracted; this may occur in the case of a network using an IPv6 transition mechanism that tunnels all traffic between the CPE and a tunnel endpoint, where the packet being processed is still encapsulated inside the tunnel. Once the various matching process have been performed, the packet may be associated with 0 or more Device IDs. If none of the matching processes matched a Device ID, then the packet will not be associated with any Device IDs.

At 220, Layer 7 correlation procedures are executed. The intent of the correlation procedures is to use knowledge of application layer protocols to increase the percentage of packets that can be associated with a Device ID. For example, IPv4 UDP packets that do not have a predictable IP ID may not be matched to a Device ID by any of the matching processes. However, many of the UDP-based application protocols on the Internet have characteristics that can be used to associate them to a known Device ID. The correlation procedures are intended to inspect the payload of the packet and update the state based on the payload contents. On completion of the correlation procedures, the packet may be associated with 0 or more Device IDs. If none of the matching process or Layer 7 correlation procedures match a Device ID, then the packet will not have any associated Device IDs. Although discussed in sequence, it will be understood that in some embodiments of the method, the matching processes and correlation procedures may be run simultaneously or in other sequences.

At 225, device classification is done by associating device metadata with a Device ID. The packet being processed is inspected for any information that can be used to refine the classification of the Device ID data associated with the packet. This classification may use any information from the packet contained in any network headers or in the Layer 7 payload of the packet. For example, this classification may include techniques such as OS fingerprinting, analysis of the HTTP User-Agent field, or the like.

In one case, the HTTP User-Agent field can be used to refine the classification of the device. For example, known user-agent patterns can be extracted from the information in the HTTP User-Agent.

In another case, the information can be further refined by looking up the device manufacturer and model in a device database. This is intended to allow for a great deal of information to be known about a device in real time.

An additional technique that may be used which is intended to improve the accuracy of device classification is device matching. Device matching is a way to classify a Device ID for packets that have not yet had a Device ID associated with them. This technique uses data about the device, retrieved from the packet or associated with the packet, to associate the packet with a known instance of that device.

As an example, Session Information Protocol (SIP) packets have a User-Agent field, but these packets use UDP, so the device matching processes and Layer 7 correlation procedures may not find a matching Device ID. By doing user-agent analysis of the SIP packet and looking up the resulting device in a set of current active devices being used within the current session, a known Device ID may be found for the packet. This technique may result in an approximation of the Device ID; for example, if there are two separate instances of that device in use by the subscriber, it may not be possible to know which one, so some further heuristic may be used to estimate the correct Device ID, such as associating the packet with the most recently seen Device ID. If there is no Device ID known for that device, a new Device ID may be created for the device.

As part of the device classification procedure, it may be possible to find a unique identifier for the device, such as a serial number, an Ethernet MAC address, or a Unique Device Identifier (UDID). If such an identifier is found, the identifier is associated with the device as additional metadata, which is intended to provide additional information to the Device ID. At the end of the classification procedure, the packet may be associated with 0 or more Device IDs and device metadata is associated with the Device ID.

At 230, the Device ID state is updated. If the packet has been associated with an Active Device ID, then any Unassigned Device IDs associated with the packet are updated to be the Active Device ID. For example, if an Active Device ID was found by the TCP Timestamp match and the IPv6 match resulted in an Unassigned Device ID, the Unassigned Device ID is assigned to the Active Device ID from the TCP Timestamp match. In this way, a plurality of different methods can be used to find the Device ID for various types of packets sent by a device. If the packet has only been associated with Unassigned Device IDs, these Device IDs are all set to a single Device ID which is set to the Active state.

Once the Device ID has been assigned, at 235, timers for the Device ID are updated. In one case, the Device ID is associated with two timers: an idle timer and a state timeout timer. The idle timer is used to detect when a device is idle; it is a heuristic that indicates whether a device is likely currently active on the network. In an example, the idle timer is set to 5 minutes and the state timer is set to 1 hour. In another example, the idle timer and the state timer are set to different values depending on the device; for example, one OS may be known to poll the network only once every hour when it is connected but idle, so the state timeout timer is set to over an hour for that type of device.

In some cases, the idle timer and state timeout timer for the Device ID are both reset when a packet is received, and if the Device ID was in the idle state, the Device ID is moved to the active state. In other cases, the state timer may not be initiated until the Device ID has been transitioned to an idle state, and if the packet is received when the Device ID is in the active state, only the idle timer may be reset.

In some cases, if the idle timer expires, the Device ID is moved to the Idle state. If the state timeout timer expires, the Device ID is moved to the Deleted state. In this case, all Device ID data associated with the Device ID, such as Device ID data stored for the matching processes, and device metadata, may be deleted from memory.

In other cases, the Idle timer is not used, and the state timeout timer controls both timeout events; in this case, when the device is considered inactive on the network, its state may also be deleted. In the case where a timer event initiated a Device ID update, no packet will be associated with the Device ID.

Updating the Device ID state may also be triggered by a notification of a session ending, at 240. A session ending may be triggered by the CPE disconnecting from the access network, ending the CPE's session. In an embodiment, the session end causes all Device IDs for that session to move to the Deleted state, since the devices are no longer on the network. In another embodiment, the session end causes all Device IDs for that session to move to the Idle state, since the session may be re-established in the near future. In the case where a session end event started the updating of the Device ID states, the rest of the method 200 can be executed, but no packet is associated with the Device ID.

At 245, a device model is updated based on the updated Device ID and corresponding metadata. The device model is an in-memory representation of the devices in the network, indexed by a plurality of dimensions such as subscriber, session, device type and device manufacturer. The device model is updated by adding the current Device ID, if the current Device ID is transitioning to the active state, and removing the current Device ID, if the current Device ID is transitioning to the idle state. Each device has a plurality of facts associated with the device, which may be updated once a packet is received and reviewed.

In an embodiment, a byte counter is associated with the current device and the byte counter is updated with the length of the current packet, and a packet counter counting the number of packets for a device is incremented by 1.

At 250, enforcement actions are taken based on the Device ID data. In an embodiment, enforcement is done based on a policy repository that defines rules per subscriber. For example, there may be a quota for the number of devices a subscriber can use concurrently. In this example, when the current Device ID transitions to Active state, the device model is checked for the number of devices active for the current subscriber. If the subscriber is over the device quota, the packet may be dropped, or another action may be taken, such as a warning to the subscriber. In another example, enforcement may be done by another device in the data path, so the packet is simply marked and forwarded for a downstream device to manage. In some cases, there may be a network device in the network that has the capability to drop packets and take traffic management actions more efficiently. Further, by having enforcement done by another network device, the system for analysis of devices accessing a network may not require the ability to provide traffic management functionality. In other cases, traffic management enforcement actions may be applied by the system.

In yet another example, enforcement is signaled to another system using a policy control protocol such as PacketCable Multimedia (PCMM) or Diameter. In another example, some devices are prioritized over others according to the manufacturer and model of the device. In still yet another example, there is a limit on the number of Smart TV devices a subscriber can use at a time, based on the service plan of the subscriber.

At 255, data is exported to external systems so that data can be acted on in real time or stored for historical reporting and analytics. From that data, various analytics use cases can be met. Data may be exported using any data export protocol, such as Internet Protocol Detail Record (IPDR) and Internet Protocol Flow Information Export (IPFIX).

In one example, data records are exported from the system at a predetermined interval, for example, every 5 minutes, every 15 minutes, every hour, or the like, using IPDR. Each record contains device metadata, for example, the device manufacturer, model, operating system, OS version, marketing name, screen resolution, the subscriber identity and IP address, the time when the device became active, upstream and downstream byte, packet counts, or the like. This data is collected and stored by an analytics system, and may be used for business intelligence purposes, for example, understanding how many devices are used per subscriber on average at different times of the day, or the like. One skilled in the art will realize that any number of other metrics may be published in these records, and a plurality of records per device may be sent, for example a record per device, per application, or the like, may be sent to provide a finer-grained level of detail.

In another example, an event is sent using IPFIX whenever a Device ID transitions to Active status or Idle status. Each event is retrieved by a subscriber analytics tool that provides a real-time view of a subscribers' activity to help customer support operators troubleshoot problems reported by subscribers.

In still another example, data records are stored locally, containing metadata, for example, the subscriber identity, the device manufacturer and model, and the number of bytes used. Files are periodically uploaded to a billing system which uses the records to subtract activity for specific devices from subscribers' charged usage, based on the subscriber's participation in some device-specific marketing promotion.

Figure 3:
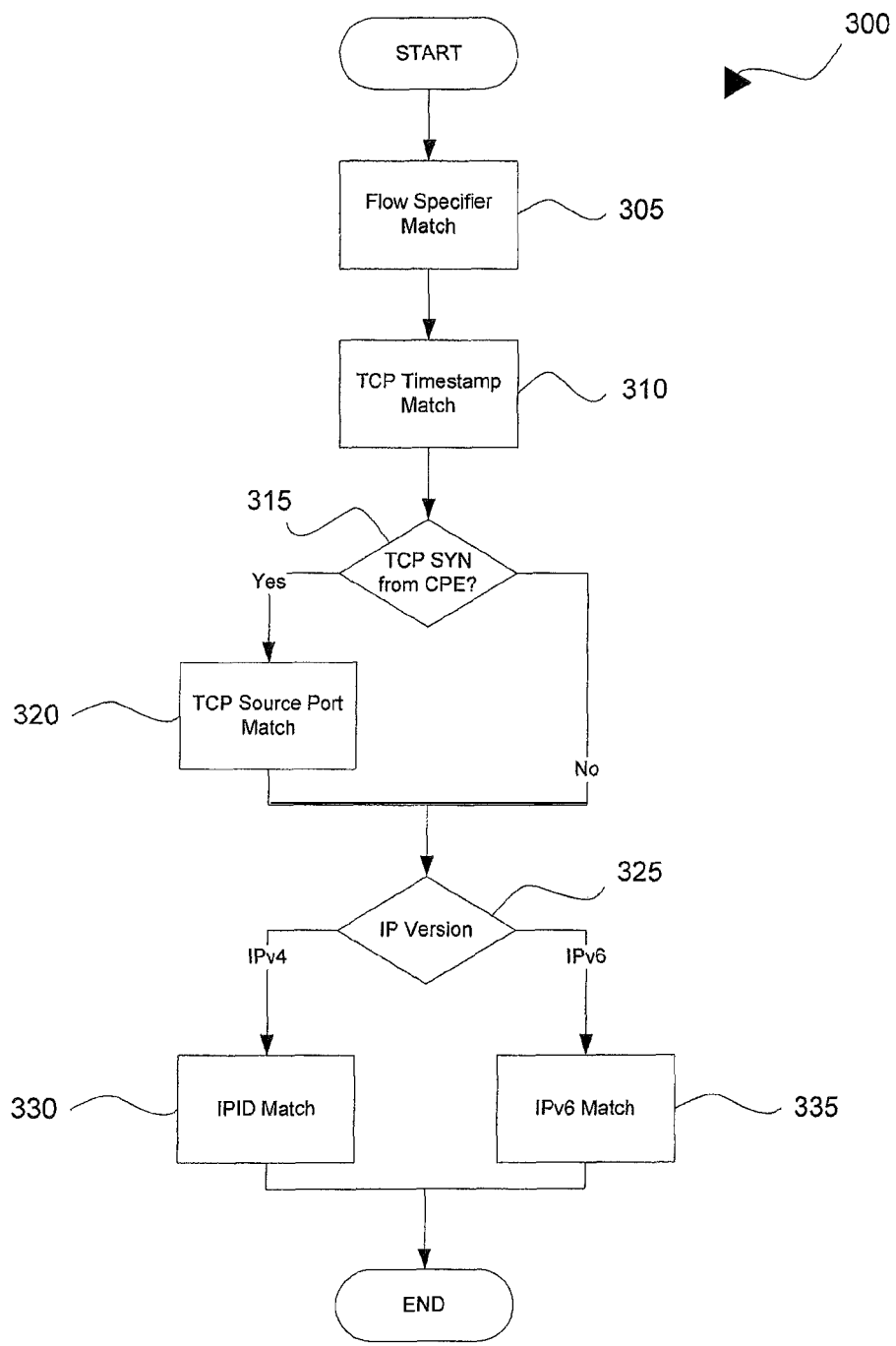
FIG. 3 is a flowchart of an embodiment of a method for device tracking.

FIG. 3 is a flowchart of an embodiment of a method 300 for device tracking. It is intended that the method 300 for device tracking results in assigning at least one Device ID for a current packet by performing a sequence of matching processes to the packet. If a matching process in the sequence finds a Device ID for the packet, the packet may continue to be evaluated by the other matching processes, since it is possible for the packet to be matched by multiple processes.

At 305, the packet is matched against a flow specifier. The flow specifier is a programmable search on the identity metadata, such as the session, and the 5-tuple of the packet. The flow specifier data may be added and removed dynamically throughout the method; for example, once the packet within the session is classified as belonging to a particular Device ID; all subsequent packets in that bi-directional IP flow belong to the same Device ID, so the session and 5-tuple of the packet can be entered into the flow specifier match for the duration of the flow.

In an embodiment, partial matches may be entered into the flow specifier match. For example, the method may determine that a device has a listening port opened; therefore, any incoming traffic to that port must belong to that Device ID. In this example, the flow specifier entry may be a wild-carded match where only the CPE IP address and port are entered, and the Internet IP address and Internet port would match any value. In another example, the identity metadata may include information about a range of ports assigned to a specific device behind a NAT; this information may be retrieved from the NAT gateway. In this case, a flow specifier would be created to match all TCP and UDP traffic with that CPE IP address and a port within the port range to the Device ID.

At 310, the packet is checked for a TCP Timestamp. If the packet is a TCP packet and the packet has the TCP Timestamp option, the TCP timestamp is compared against the set of TCP timestamp state being stored for the session. One skilled in the art will realize there are many methods available for comparing the TCP time stamp.

In an embodiment, there is a table of TCP Timestamp based Device IDs stored for each session. Each row of the table contains the last TCP Timestamp value seen, the time when the last TCP Timestamp value was seen, and the estimated rate of TCP timestamps for this Device ID. The received timestamp of the current packet is reviewed and the stored last timestamp is subtracted from it. The result is multiplied by the estimated rate, and added to the stored last timestamp. If the result is within a configurable distance from the TCP timestamp of the current packet, then the current packet is a match for that Device ID. This check takes the rollover of the TCP Timestamp into account, where the TCP timestamp rolls over when it hits a maximum possible value (for example, 2^32). If no tracked Device ID matches the current packet, then a new unassigned Device ID is created. The stored last timestamp value and last packet timestamp of the matched Device ID are updated with the TCP Timestamp and packet timestamp of the current packet, whether the matched Device ID state is an Unassigned state or another state. One skilled in the art will realize that there are various ways to implement this match of a packet to a Device ID based on the TCP Timestamp, and that the various ways may have different tradeoffs in terms of performance and accuracy.

At 315, the packet is reviewed to determine if the packet is a TCP Synchronize (SYN) packet from the CPE. At 320, if the packet is a SYN packet from the CPE, the packet is reviewed to retrieve a TCP source port match. Some operating systems use a predictable sequence of source ports for new TCP connections. For example, Windows operating systems increase the source port by 1 for each new TCP connection. This property can be used to match new connections to a Device ID. The packet is compared against the set of Device IDs being stored for the session. For the Device ID that has the last source port closest to the source port of the current packet, if the source ports are sufficiently close within a predetermined threshold, the current packet is matched to that Device ID.

In some cases, the TCP source port match takes the rollover of the source port into account, where different operating systems may roll over the source port at different maximum values. For example, Windows 7 starts its port range at 49152 and rolls over at 65535. If no tracked Device ID has a source port that is within the predetermined threshold to the source port of the current packet, then a new unassigned Device ID is created. The stored last source port of the matched Device ID is updated with the source port of the current packet. One skilled in the art will realize that there are various ways to implement this match of a packet to a Device ID based on the TCP Source Port, and that the various ways may have different tradeoffs in terms of performance and accuracy.

At 325, the IP version of the packet is determined. At 330, if the packet is an IPv4 packet, the packet is reviewed for an IP ID match. Some operating systems use a predictable sequence of IP IDs, such as incrementing the IP ID by 1 for each IP packet sent. This property can be used to match sequences of packets to a Device ID. The packet is compared against the set of Device IDs being stored for the session. For the Device ID that is the most likely device to have emitted the IP ID of the current packet, the current packet is matched to that Device ID. This check takes the rollover of the IP ID into account, where the IP ID rolls over when it hits the maximum possible value (for example, 2^16). If no tracked Device ID is likely to have emitted the IP ID, then a new unassigned Device ID is created. The stored last IP ID of the matched Device ID is updated with the IP ID of the current packet. One skilled in the art will realize that there are various ways to implement this match of a packet to a Device ID based on the IP ID, and that various ways may have different tradeoffs in terms of performance and accuracy.

At 335, if the packet is an IPv6 packet, the packet is checked for an IPv6 match. Since Network Address Translation (NAT) is generally not used in IPv6 networking, the CPE-side IP address of an IPv6 packet may be matched to one Device ID. However, it is possible for a single device to have more than one IPv6 address; for example, a temporary IPv6 address may be used that can change after a period of time. The previous matching processes may be used to find a Device ID for an IPv6 packet based on the TCP Timestamp and TCP Source Port. If one of these processes matched a Device ID, this Device ID is looked up and the IPv6 address associated with the matched Device ID is updated if the address has changed. If the Device ID is not known, for example in the case of a UDP packet that did not match a flow specifier, then the IPv6 address is looked up and the current packet is matched to that Device ID. If there was no Device ID for the IP address, a new unassigned Device ID is created for the IP address. This matching process is intended to ensure that a dual-stack device is assigned the same Device ID for both IPv4 and IPv6 traffic.

In an example with a dual-stack device, if the first IP packet seen is an IPv4 TCP packet with a TCP Timestamp option, this packet may be associated with a new Device ID by the TCP Timestamp matching process. When an IPv6 packet from the same device with a TCP Timestamp option is seen, the TCP Timestamp matching process is able to associate the packet with the same Device ID, and the IPv6 matching process will assign that Device ID to all future packets with that IPv6 address.

In another example with a dual-stack device, if the first IP packet seen is an IPv6 TCP packet with a TCP Timestamp option, the packet will be associated with a new Device ID by the TCP Timestamp matching process, and the IPv6 matching process will assign that Device ID to all future packets with that IPv6 address. When an IPv4 packet from the same device with a TCP Timestamp option is seen, the TCP Timestamp matching process will associate the packet with the same Device ID. In this way, dual stack devices can be properly recognized as a single device.

In a further example, if the device changes its IPv6 address, the next packet with a TCP Timestamp would be recognized as the same Device ID by the TCP Timestamp matching process, and the IPv6 matching process will assign that Device ID to all future packets with that IPv6 address. This technique uses the property that the same operating system is used for all of the IP addresses of a device, and the single operating system instance uses the same sequences of values such as TCP source ports or TCP Timestamp values across all IP addresses used by the device. In this example, it is intended that a device using a plurality of IPv6 temporary addresses is assigned to a single Device ID.

In some cases, a device may have multiple IP addresses, even if the device is using IPv4; for example, a device with multiple network interfaces. It is intended that the method 300 will correctly count the device even if the device has multiple IP addresses, as various matching processes such as the TCP Timestamp, TCP Source Port, or IP ID algorithms can be used to associate a packet from the device to the Device ID.

One skilled in the art will realize that there may be other packet attributes or heuristics that can be matched by applying some matching criteria to the current packet, resulting in the classification of that packet to a Device ID. Other matching processes may be added to the sequence of processes in the method 300. Also, some of the processes may be removed in some cases; for example, if there were a case where IPv6 NAT is used, the IPv6 matching process may be removed, and the other processes may be used to count devices behind the IPv6 NAT.

The classification of a packet to a Device ID is probabilistic; that is, some of the matching processes may incorrectly classify a packet to a Device ID. Trade-offs between over-counting and under-counting devices may be made by tuning the processes to be more or less precise in how the processes match packets to Device IDs.

Figure 4:
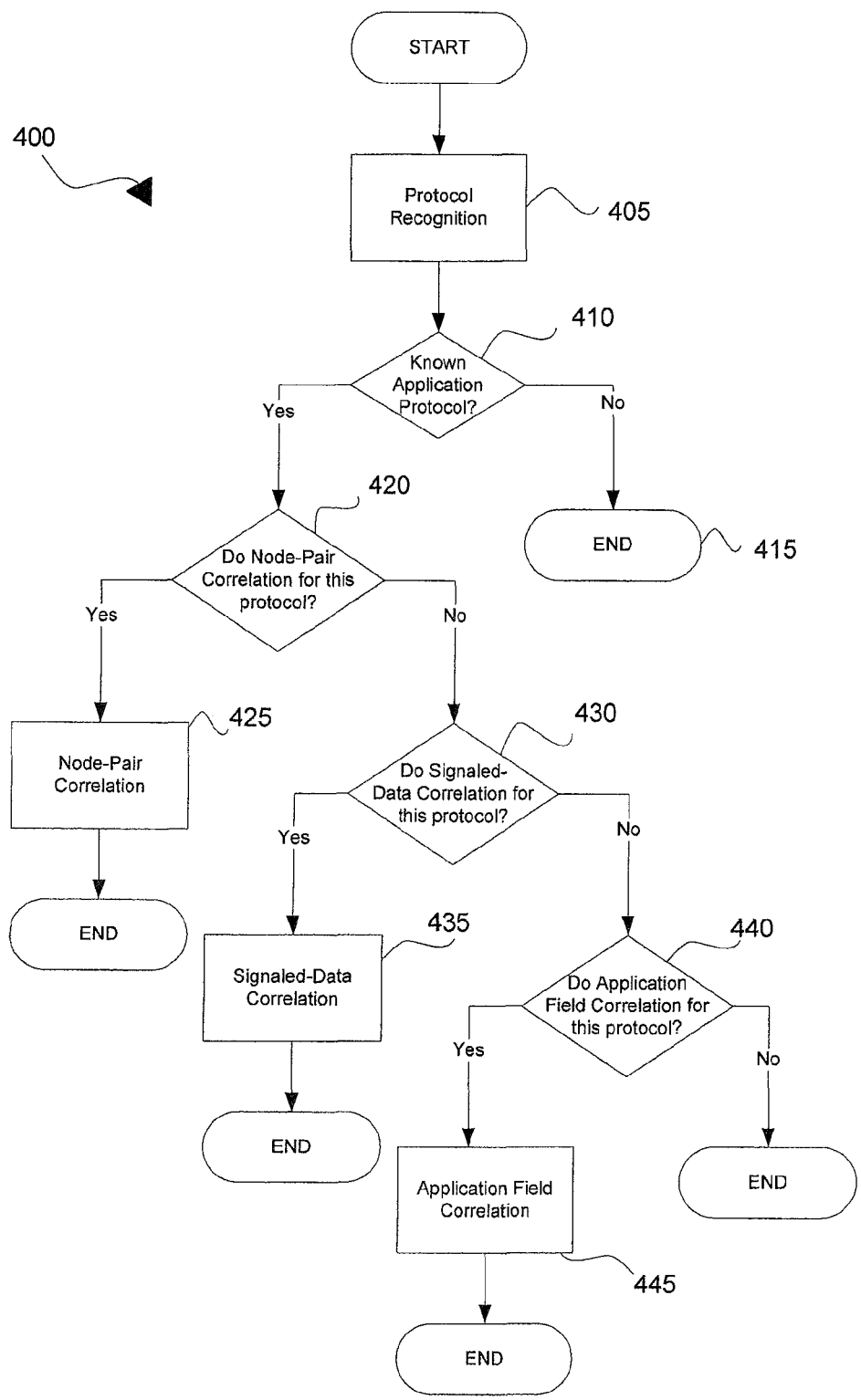
FIG. 4 is a flowchart of an embodiment of a method for Layer 7 correlation.

FIG. 4 is a flow chart of an embodiment of a method 400 for Layer 7 correlation. This method 400 is intended to inspect the payload of the packet and update the Device ID data based on the payload contents. The following examples are provided for clarity, but one skilled in the art will realize that there are many ways in which device classification can be improved using application-specific methods.

At 405, protocol recognition is applied to the packet. Protocol recognition is intended to find an application protocol for the packet, by inspecting the Layer 7 payload of the packet. In some cases, protocol recognition may be done using a set of pattern matches for application protocols that are used for Layer 7 correlation. In other cases, there may be a Deep Packet Inspection (DPI) system that the packet is passed through, that returns metadata including the application protocol.

At 410, if the application protocol is determined, the packet may be reviewed for further analysis. Otherwise, the method for layer 7 correlation may be completed for the packet, at 415.

At 420, the packet may be passed to a correlation procedure. Each correlation procedure may handle a plurality of application protocols. At 425, node-pair correlation may be done on selected protocols; for example, this technique is useful for application protocols that use both TCP and UDP such as BitTorrent™ and Skype™. A characteristic of these protocols is that they frequently establish connections between the device and various hosts on the Internet, using both TCP and UDP traffic, within a short time interval. These protocols use a fixed UDP port on the device for all UDP traffic.

In some cases, when a packet using one of these protocols is recognized, the packet's source and destination IP address are stored in memory, and associated with the current session. If there is an active Device ID associated with the packet from the device tracking method 300, the Device ID is also stored. If the packet is a UDP packet, the CPE-side UDP port is stored. In some cases, this CPE-side UDP port is stored for a predetermined time, such as 30 seconds, 1 minute, or the like, and is then cleared. The predetermined time may be a short period of time as a characteristic of the protocol is to use the UDP port for a short period of time; the port may then be available to another device using the same server. Within the predetermined time, if a UDP packet of the same application protocol without a known Device ID passes between the same pair of IP addresses, the stored Device ID is associated with the packet. The CPE-side UDP port may also be entered into the flow specifier match process so that future traffic using that UDP port within the same session is automatically associated with the correct Device ID. If the packet was handled by this node-pair correlation than the Layer 7 correlation method may end.

At 430, the correlation method determines whether to perform signaled-data correlation for the protocol. At 435, signaled-data correlation may be done on selected protocols; for example, this technique is useful for protocols that use control flows to signal data flows where the data flows use UDP, such as Session Initiation Protocol (SIP) and Real-time Streaming Protocol (RTSP). Signaled-data correlation, receives a packet when the packet is recognized as using an appropriate protocol and there is an active Device ID associated with the current packet. The 5-tuple of the data flow is parsed from the control flow and the 5-tuple is entered into the device tracker state used by the flow specifier match process so that when the data flow starts the data flow will automatically be associated with the correct Device ID.

In an example, an RTSP control flow has a Device ID which was identified by the TCP Timestamp tracking process. The RTSP packet contains the 5-tuple of a Real-time Transport Protocol (RTP) data flow that will carry video traffic. The 5-tuple is entered into the device tracker state used by the flow specifier match process. When the RTP flow starts, the flow is associated with a Device ID by the flow specifier match process.

Application field correlation may be performed on the protocol, at 440. At 445, application field correlation may be performed on application protocols that use both TCP and UDP and share some common field, such as a username, in both protocols. For example, some gaming protocols first connect to a HTTP server to check for updates, and then use a UDP protocol for the real-time gaming traffic. These protocols use a fixed UDP port on the device for all UDP traffic. When a packet using one of these protocols is recognized, the common field is stored in memory and associated with the current session. If there is an active Device ID associated with the packet from the device tracking method, the Device ID is also stored. If the packet is a UDP packet, the CPE-side UDP port may also be stored. In some cases, this CPE-side UDP port is stored for a predetermined time, such as 30 seconds, 1 minute, or the like, and is then cleared. The predetermined time may be a short period of time as a characteristic of the protocol is to use the UDP port for a short period of time; the port may then be available to another device using the same server. Within that time, if a UDP packet without a known Device ID is inspected, where the common field is the same as the saved common field, the stored Device ID is associated with the packet. The CPE-side UDP port may also be entered into the flow specifier match process in order for future traffic using that UDP port within the same session may be automatically associated with the correct Device ID.

In some cases, other correlations procedures may be applied based on the protocol determined. The correlation procedures are not intended to be limited to the procedures described herein. In some cases, it may be appropriate to apply multiple correlation procedures to the packet, depending on the protocol of the packet. In this case, after preforming a correlation procedure, and retrieving the correlation from the procedure, the packet may be reviewed by another correlation procedure, which may be applicable for the protocol of the packet. The packet may be reviewed for further analysis by a plurality of correlation procedures if a plurality of correlation procedures is applicable to the protocol of the packet.

Figure 5:
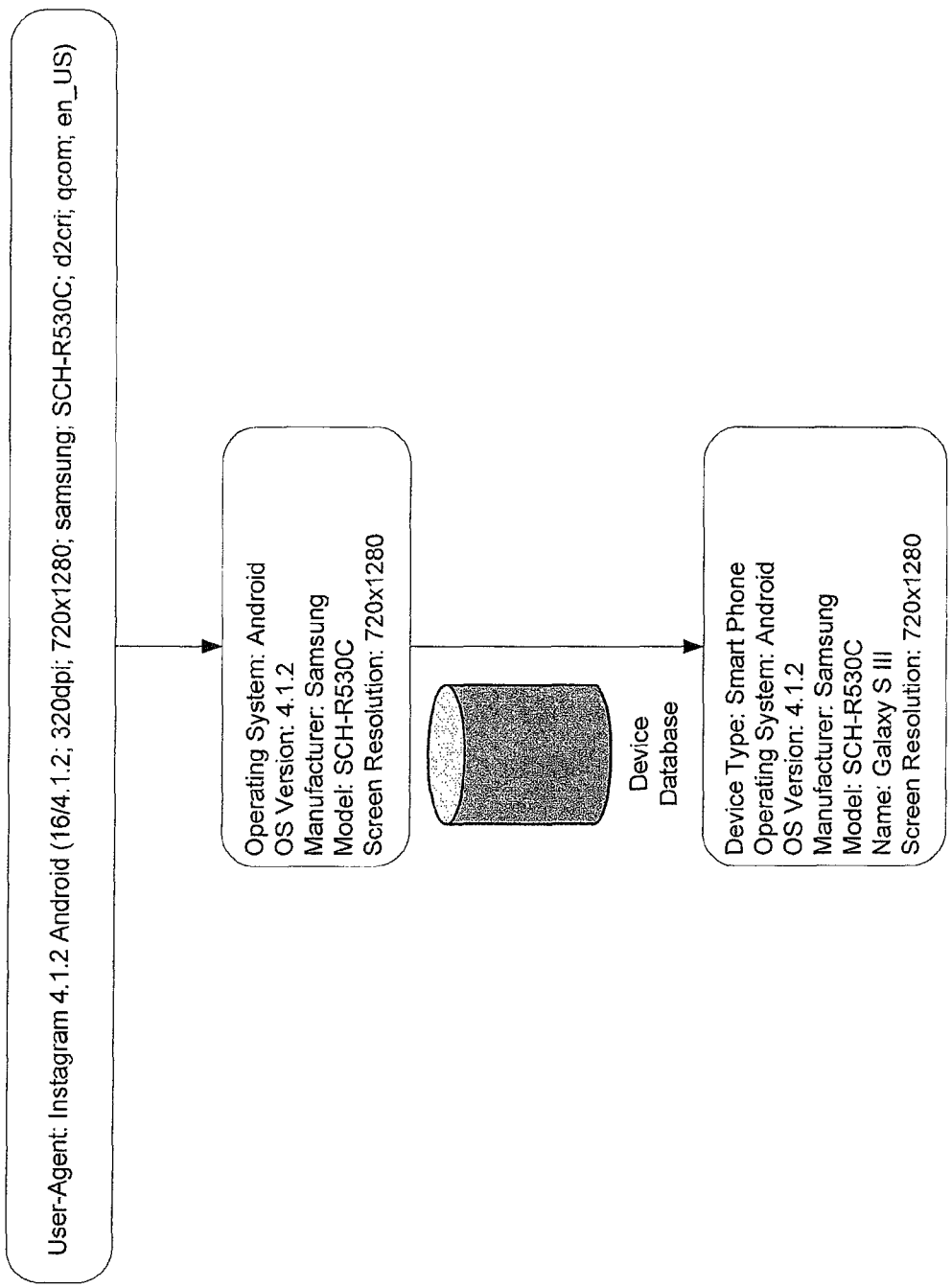
FIG. 5 illustrates an example of device classification.

FIG. 5 illustrates an example of device classification performed by user-agent analysis. In this example, the operating system, OS version, Manufacturer, Model and screen resolution are extracted from a single user-agent string. There are various user-agent patterns that could have different types of metadata extracted from them and the metadata could be extracted from other fields of a packet or from the combined payload of multiple packets. In one embodiment, once metadata such as the manufacturer and model are read from the packet, these fields may be looked up in a Device Database to obtain more metadata about that type of device.

Figure 6:
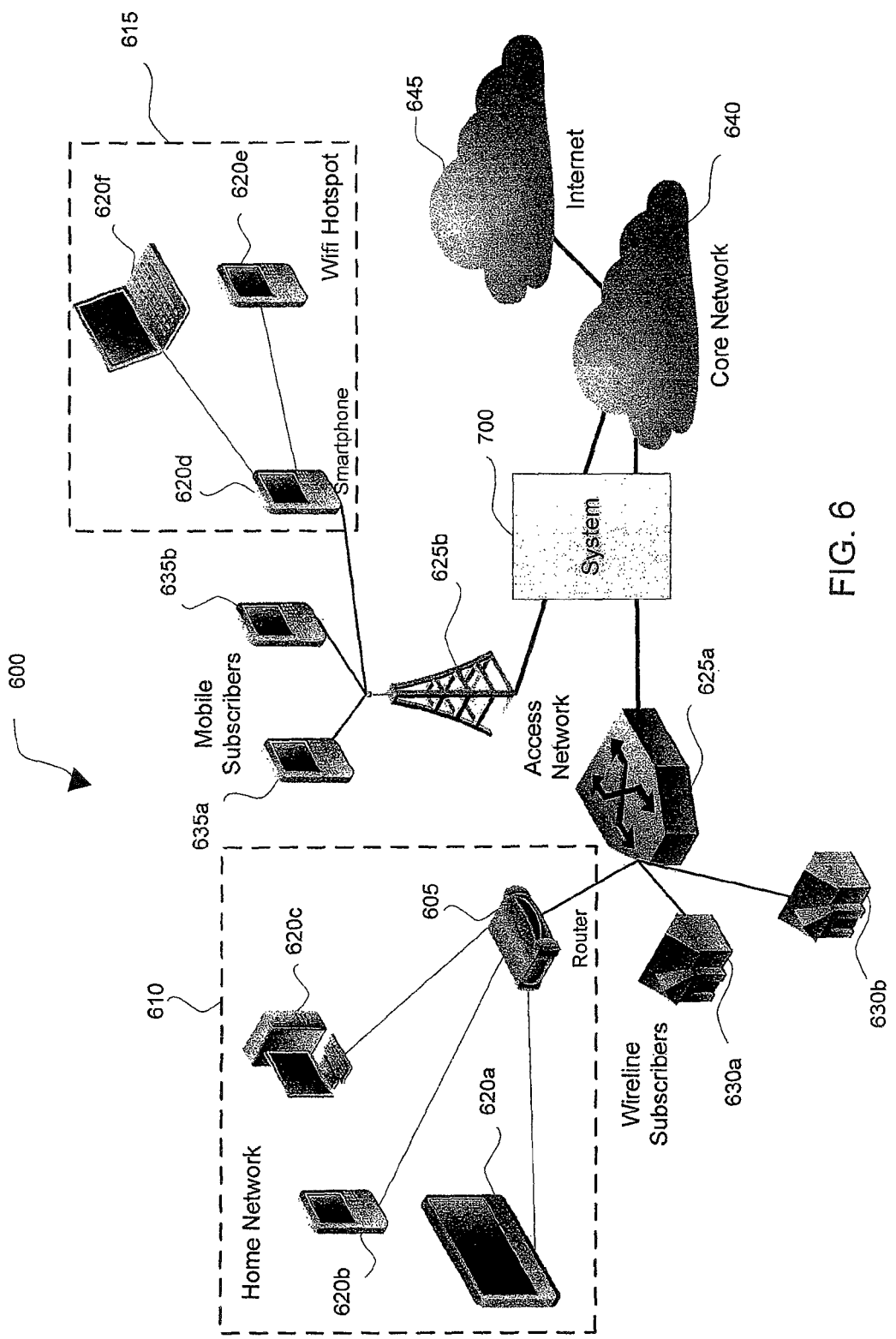
FIG. 6 is a block diagram of a network setup including an embodiment of a system for analyzing devices on a network.

FIG. 6 illustrates an example network 600 with an embodiment of a system 700 for analyzing devices accessing the network 600. The system 700 is configured to identify, classify and manage individual devices behind a CPE; for example, a router 605 in a home network 610 and a Wi-Fi hotspot 615. The router 605 connects a plurality of individual devices 620a, 620b and 620c to an access network 625a. Other subscribers 630a and 630b may have a similar setup to the home network 610 and may include a plurality of devices connecting to the access network 625a via the CPE.

The Wi-Fi hotspot 615 uses a smartphone device 620d to connect devices 620e and 620f to an access network 625b. Other mobile subscribers 635a and 635b may also be connected to the access network 625b and may be adapted to create a separate Wi-Fi hotspot. The system 700 inspects and processes packets that are routed or forwarded between the access networks 625a or 625b and a core network 640. The core network 640 sends and receives packets to and from the Internet 645. One skilled in the art will realize that the system 700 may sit in the path of traffic, may have traffic forwarded to it by another network device such as an access router, or may be implemented as part of another network device such as the access router.

Figure 7:
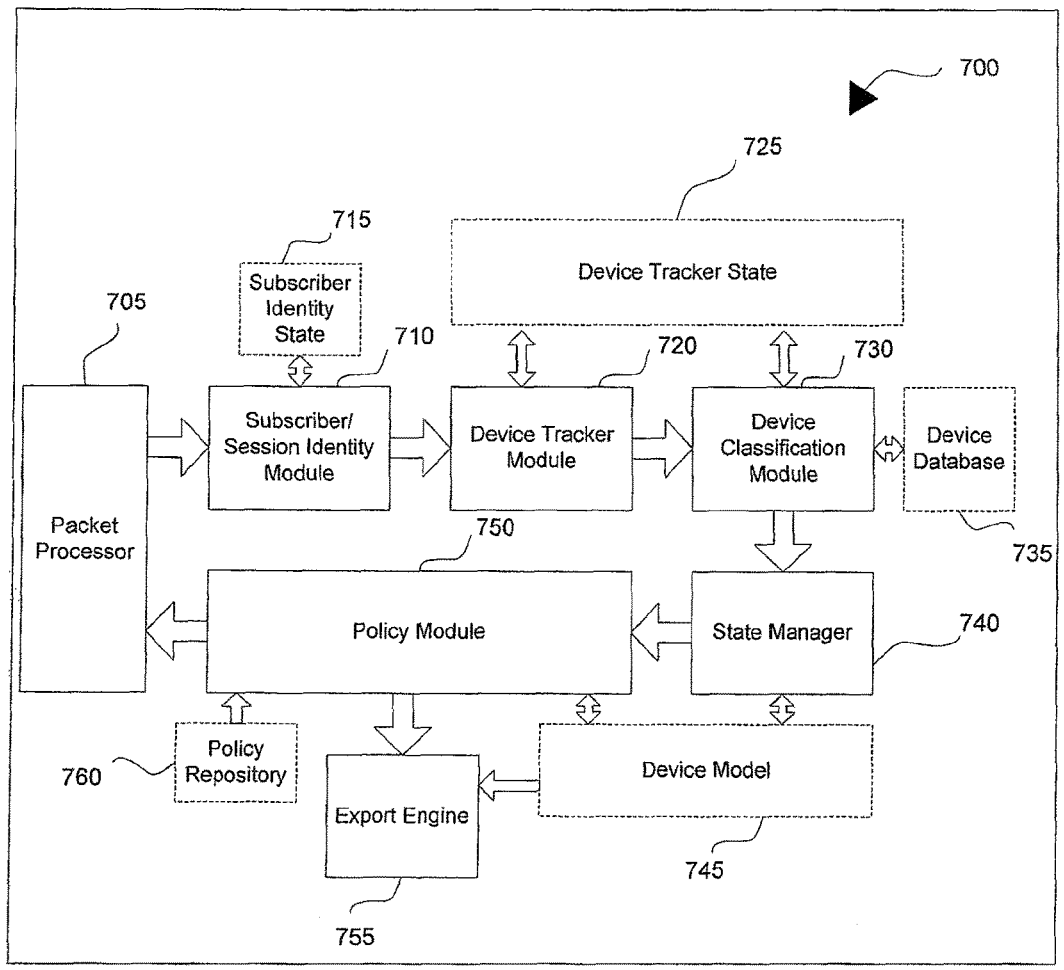
FIG. 7 is a block diagram of an embodiment of a system for analyzing devices on a network shown in FIG. 6.

FIG. 7 illustrates an embodiment of the system 700 for analysis of devices accessing the network. The system 700 is configured to implement the embodiments of the method for analyzing devices accessing the network as shown in FIG. 2. A Packet Processor 705 receives packets from the network and forwards packets to the rest of the system The Packet Processor 705 may further return the packet to the network once the processing has been completed on the packet.

A Subscriber/Session Identity Module 710 receives the packet from the Packet Processor 705 and associates the network packet with a subscriber ID and possibly a session ID. The Subscriber/Session Identity Module 710 may query a Subscriber Identity State Repository 715 to retrieve information about the subscriber and session associated the subscriber ID as the packet does not contain this information when the packet is received by the Packet Processor 705.

A Device Tracker module 720 receives the packet from the Subscriber/Session Identity Module 710 and associates the network packet with a Device ID. The Device Tracker module 720 may further update the Device Tracker State Repository 725. A Device Classification Module 730 classifies the Device ID with various metadata that describes the device and stores the device metadata in a Device Database 735.

A State Manager 740 receives the packet from the device Classification module 730 and maintains and updates a model of devices currently connected to the network and counters related to each device. The State Manager 740 retrieves information regarding the Device Model Repository 745 and may further update information regarding the Device Model 745. An Export Engine 755 exports data records related to the life cycle of a device to other systems. A Policy Module 750 reads policy rules from a policy repository 760 and takes actions by updating the Device Model Repository 745 and may apply a policy action to the packet.

There are several data repositories that are part of the system, where data used by the system is stored. The Subscriber Identity State Repository 715 stores data mapping IP addresses to identity metadata. The Device Tracker State Repository 725 stores data related to Device IDs. The Device Database 735 stores device metadata. The Device Model Repository 745 stores a model of devices currently connected to the network and metrics for each device. The Policy Repository 760 stores policy rules related to devices and subscribers. The repositories may be a centralized repository system accessible by the modules of the system or may be a distributed repository system.

The Packet Processor 705 is configured to interact with the network. One skilled in the art will realize that there are many ways the Packet Processor 705 can be connected to the network. In an example, the Packet Processor 705 is connected in-line to the network so that the Packet Processor 705 intercepts all traffic between the provider's access network and the core network. In another example, some or all of the network traffic is copied to the system 700 for analysis.

In some cases, the rest of the system 700 handles the packet in-line, and the packet is returned to the Packet Processor 705 by the Policy Module 750 to be forwarded back to the network. In still other cases, the Packet Processor 705 forwards the packet to the network but sends a copy of the packet to the modules of the system 700. This case may be desirable in order to minimize network latency introduced by the system 700. In other cases, some packets are forwarded immediately but others are passed in-line through the system 700; for example, if policy only needs to be done on the first packet of an IP 5-tuple and the Packet Processor 705 is 5-tuple aware, the Packet Processor 705 may send the first packet of each 5-tuple flow in-line through the system 700, but other packets may simply be copied to the system 700 and forwarded immediately. The system 700 may be distributed across different network links or geographies for reasons of scale. One skilled in the art will realize that there are many ways to build a scalable system that works when packets are not delivered to the same packet processor when there are multiple systems working together, such as using a distributed database to store the state repositories, or load balancing packets so that the same subscriber's packets are always handled by the same system.

The Subscriber/Session Identity Module 710 is configured to associate each packet received from the Packet Processor 705 with identity metadata, such as a unique identifier for the subscriber and the session. In an embodiment, identity metadata is stored in a Subscriber Identity State repository 715. The Subscriber Identity State repository 715 may be populated with identity metadata in various ways.

In an example, the Subscriber Identity State repository 715 may be configured manually by a person entering details about which subscriber is associated with each IP address on the network. In another example, the module queries a third party system for the information the first time the system 700 sees an IP address that is not currently stored in the Subscriber Identity State repository 715, and the Subscriber Identity State repository 715 stores the response for a predetermined amount of time, for example, 1 hour, 1 day, 1 month, or the like. In another example, network signaling traffic that includes a mapping between IP and subscriber is copied to the repository 715, and the module learns the subscriber data from this traffic; for example, DHCP, RADIUS, General Packet Radio Service Tunnel Protocol-Control (GTP-C), Diameter Gx, or the like may be copied to the repository 715. In still another example, the IP address is used as the subscriber identity, and the rest of the system works under the assumption that an IP address is equivalent to a subscriber. One skilled in the art will realize that there are many ways to provision an IP address to a subscriber. The identity metadata is associated with the packet and is passed along with the packet through the rest of the system 700.

The Device Tracker Module 720 is configured to associate each packet received from the Subscriber/Session Identity Module 715 with a Device ID by applying Device Tracking processes and Layer 7 correlation to the packet. These processes read and update Device Tracker State repository 725 to find the best matching Device ID for the packet. The packet, along with the identity metadata, the best matching Device ID, the state of the Device ID, and/or other information about the Device ID, is passed to the Device Classification Module 730. When a timer triggers the Device Tracker module 720, the system 700 may execute the method without a packet. However, the Device ID and its associated metadata is still passed through the system and the methods detailed herein are executed.

The Device Tracker module 720 may be further configured to handle timer events, and updates the Device ID state. If the idle timer for a Device ID expires, the Device ID state is updated to Idle and this event is passed to the Device Classification Module 730. If the state timeout timer for a Device ID expires, the Device ID is removed from the Device Tracker State repository 725 and this event is passed Device Classification Module 730.

The Device Classification module 730 is configured to add device metadata associated with a Device ID to a Device database 735. The Device Classification module 730 uses information from the packet which may be combined with information stored in the Device Tracker State repository 725 and the Device Database 735, to refine the known information about the Device ID. If more information about the Device ID is determined, this information is stored with the Device Tracker State repository 725 so that the information can be further refined in the future. Device metadata is passed along with the packet and the other information associated with the packet to the State Manager 740. If this is a timer event and not a packet, device metadata is not updated, but is read from the Device Tracker State repository 725 and passed to the State Manager 740.

The State Manager 740 updates the data stored in the Device Model repository 745, based on the data received from the Device Classification Module 740. If the Device ID is in an Active state, the Device ID is stored in the Device Model repository 745 with the device metadata and various measurements, such as byte counts and packet counts. The Device data stored in the Device Model repository 745 may also be associated with dimensions related to the device; for example, the subscriber identity, the session identifier, the network segment the device is attached to, the manufacturer of the device. This association is intended to facilitate data export and policy evaluation in the Export Engine 755 and Policy Module 750. If the Device ID is not in an Active state, and if the Device ID is currently stored in the Device Model repository 740 then the Device ID is removed from the Device Model repository 745. All information about the device and the event (the current packet or Device ID state change) is passed to the Policy Module 750.

The Policy Module 750 is configured to evaluate policy rules from the Policy Repository 760, based on the data passed from the State Manager 740, and the data stored in the Device Model repository 745. For example, a policy rule may limit the number of devices allowed to be used concurrently for a subscriber; the Policy Module 750 may check the number of devices associated with the current subscriber in the Device Model repository 745, and if the current device is over the limit, some action is taken such as a notification to an administrator, dropping the current packet, or the like. The Policy Module 750 may update the data in the Device Model repository 745; for example, a device may be labeled as "blocked" if it was over a quota and has been denied access to the network as a result. The updating of the data is intended to allow future policy evaluations to limit the correct devices, and it is further intended to allow the Export Engine 755 to include policy enforcement information in event records. After the policy related to the current device has been evaluated, the Policy Module 750 passes the current information about the device and the event to the Export Engine 755. If a packet needs to be forwarded as a result of the policy evaluation, the packet is passed to the Packet Processor 705 to be transmitted.

The Export Engine 755 is configured to export data records related to the current event. In some cases, data records would not be exported for every packet, but would be exported on a predetermined interval, for example, on a predetermined timing interval, a predetermined event occurrence, or the like. Data records may be exported for different sets of dimensions; for example, a data record may be exported for each device, sent when the device is detected, periodically while the device is online, and when the device is removed. In another example, a data record may be exported for each subscriber, sent when any device is added or removed and periodically while any device is online for the subscriber. The data sent in an event record may be based on the information passed by the State Manager 740, plus information read from the Device Model repository 745.

Figure 8A:
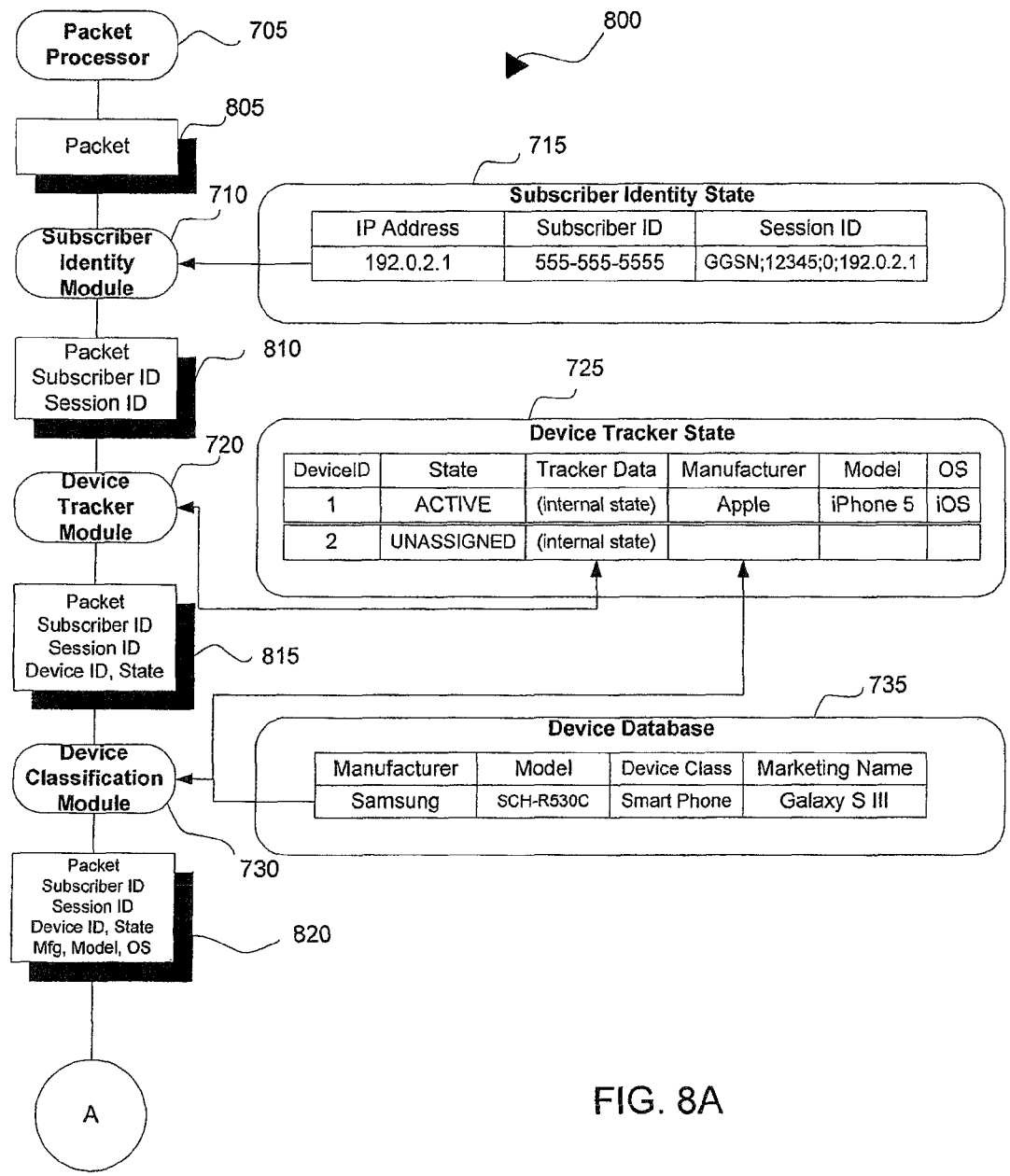
FIGS. 8A and 8B illustrate data flow through the system of FIG. 7 according to an embodiment.
Figure 8B:
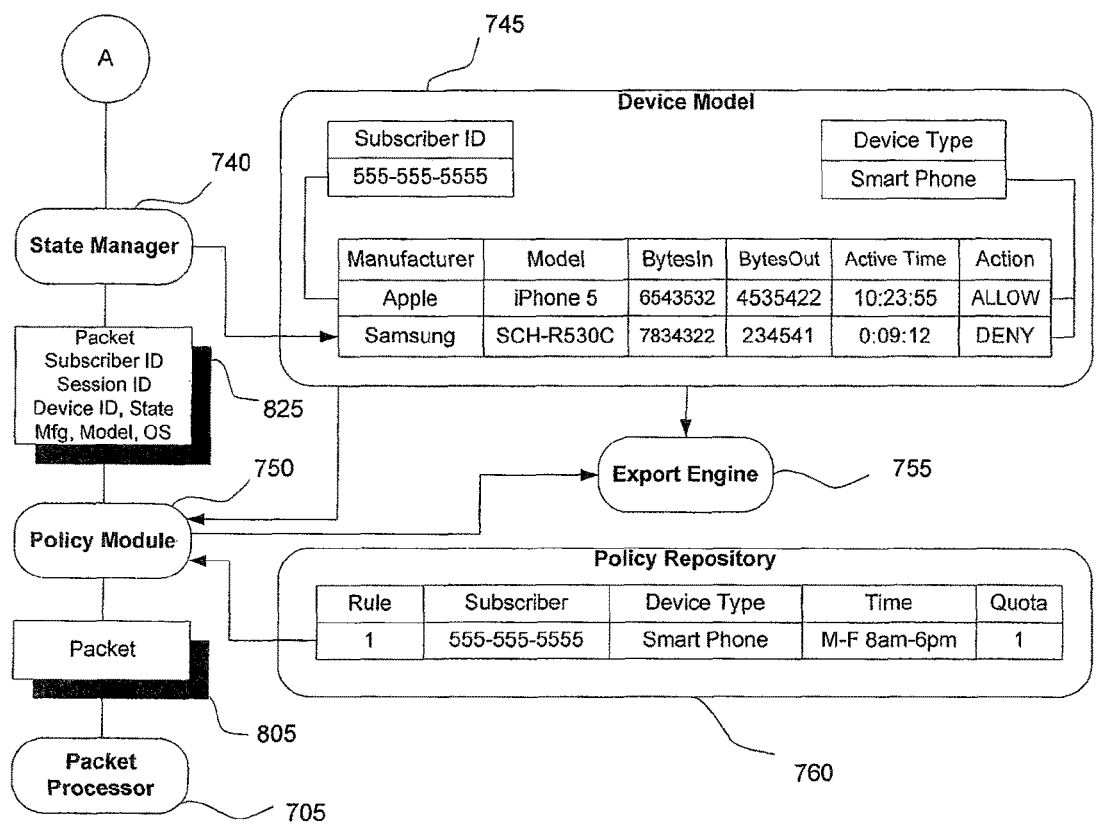

For additional clarity, FIGS. 8A and 8B depicts an example data flow 800 of a packet through the system 700, and further illustrates how the system 700 interacts with the data stored in the Subscriber Identity State repository 715, Device Tracker State repository 725, Device Database 735, Device Model repository 745, and Policy Repository 760.

The Packet Processor 705 passes a packet 805 to the Subscriber Identity Module 710, which looks up the subscriber IP address of the packet in the Subscriber Identity State repository 715. The packet is associated with a Subscriber ID and Session ID and the data 810 is passed to the Device Tracker Module 720, which operates on internal Device ID data stored in the Device Tracker State repository 725 to find a matching Device ID for the packet. The resulting Device ID and its associated Device ID data 815 are passed to the Device Classification Module 730. The Device Classification Module 730 is configured to read the current device metadata for the Device ID and update the Device ID with any new information from the packet, looking up additional metadata in the Device Database 735. The resulting device metadata 820 is passed with the other data to the State Manager 740, which updates the Device Model repository 745, as shown in FIG. 8B. The State Manager 740 forwards the packet and corresponding metadata 725 to the Policy Module 750. The Policy Module 750 evaluates rules from the Policy Repository 760 against the current packet and the device model data, updates the Device Model repository 745 with the resulting action, and forwards the packet 805 to the Packet Processor 705 if the policy allows the packet to be forwarded. The Export Engine 755 may export a data record if the Export Engine 755 is configured to do so, based on a plurality of factors as described herein.

From the example of FIGS. 8A and 8B, the data determined by the system 700 may be used to provide detailed information to the network provider. An ISP can understand the relationship between concurrent device usage and quality of experience by comparing the records sent by the Export Engine 755 to subscriber quality of experience data. An ISP can understand which devices are used by different types of content by using DPI to add an Application Protocol to the device model, and exporting records that include the application protocol. An ISP can see the correlation between the number of devices used in the home and subscribers' monthly usage by examining the records output by the Export Engine 755, and adding up the BytesIn and BytesOut metrics for each CPE. An ISP can offer different service plans that encourage or enforce a quota on the number of devices used in the home or the number of devices of certain types used in the home by adding this policy information to the Policy Repository 760.

Further, An ISP may provide free usage for particular devices by processing the records output by the Export Engine 755 and subtracting usage for the specific devices from subscribers' usage. An ISP could identify subscribers who are violating terms of service related to number of devices by analyzing the records output by the Export Engine, looking for subscribers with a high number of devices. The same technique can be used to identify subscriber who are likely to be running a business using a residential Internet subscription. An ISP can do real-time monitoring of devices used on the network by having a system that receives event records from the Export Engine 755 in real-time and keep Device ID data on devices for subscribers, or the system could have an API that provides access to query the Device Model repository 745. An ISP could identify which subscribers are using their mobile device as a Wi-Fi hotspot by analyzing the records output by the Export Engine 755 and looking for cases where multiple devices were in use at the same time. An ISP could offer a service to business customers that allow them to control which devices may access the Internet by providing an API for businesses to insert rules into the Policy Repository 760 for their subscribers.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for analyzing devices on a network comprising:

receiving, at the network, at least one packet from a Customer Premises Equipment (CPE) from a device located behind the CPE or at least one packet directed to the device located behind the CPE;
determining identity metadata associated with the at least one packet by at least one of:
  looking up the identity metadata based on IP address;
  analyzing a network layer and transport layer of the at least one packet and performing matching processes to obtain the identity metadata, wherein the matching processes comprise:
    matching against a flow specifier:
    matching a TCP timestamp,
    matching source ports;
    if the at least one packet is an Ipv4 packet, matching IP ID; and
    if the at least one packet is an Ipv6 packet, matching based on the TCP timestamp and source port; and
  analyzing an application layer of the at least one packet and performing correlation to obtain the identity metadata;
associating the identity metadata with a device identification
determining a type of the device associated with the at least one packet based on the device identification.

2. The method of claim 1 further comprising:
determining session data and subscriber data related to the at least one packet; and
updating session data and subscriber data for the device.

3. The method of claim 1 further comprising accounting for the at least one packet being sent from/to the device.

4. The method of claim 1 further comprising enforcing policy rules in real-time based on the identity metadata and the type of device.

5. The method of claim 1 wherein the at least one packet comprises a plurality of packets.

6. The method of claim 1 wherein the performing correlation to obtain the identity metadata is selected from a group comprising: node pair correlation, signaled data correlation and application field correlation.

7. The method of claim 1 wherein the performing matching processes to obtain the identity metadata further comprises determining whether the at least one packet relates to a dual-stack device or a device having more than one IP address based on the matching.

8. The method of claim 1 further comprising determining the state of the device.

9. The method of claim 8 further comprising:
initiating an idle timer and a timeout timer for the device;
updating the state of the device to idle if the idle timer reaches a threshold; and
updating the state of the device to deleted if the timeout timer reaches a threshold, otherwise returning the state of the device to active.

10. A system for analyzing devices on a network comprising:
a memory component comprising one or more modules executable by one or more processors, the one or more modules comprising:
a packet processor configured to receive, at the network, at least one packet from a Customer Premises Equipment (CPE) from a device located behind the CPE or at least one packet directed to the device located behind the CPE;
a subscriber/session identity module configured to determine identity metadata associated with the at least one packet based on looking up the identity metadata based on IP address;
a device tracker module configured to analyze a network layer and transport layer of the at least one packet and perform matching processes to obtain the identity metadata or analyze an application layer of the at least one packet and perform correlation to obtain the identity metadata, wherein the matching processes comprise:
matching against a flow specifier:
matching a TCP timestamp:
matching source ports:
if the at least one packet is an Ipv4 packet, matching IP ID: and
if the at least one packet is an Iv6 packet, matching based on the TCP timestamp and source port: and
a device classification module configured to associate the identity metadata with a device identification and determine a type of the device associated with the at least one packet based on the device identification.

11. The system of claim 10 wherein:
the subscriber/session identity module is further configured to determine session data and subscriber data related to the at least one packet; and
the device classification module is further configured to update session data and subscriber data for the device.

12. The system of claim 10 wherein the device classification module is further configured to account the at least one packet being sent from/to the device.

13. The system of claim 10 further comprising:
a policy module configured to enforce policy rules in real-time based on the identity metadata and the type of device.

14. The system of claim 10 wherein the at least one packet comprises a plurality of packets.

15. The system of claim 10 wherein the device tracker module is configured to perform correlation to obtain the identity metadata by performing an operation selected from a group comprising: node pair correlation, signaled data correlation and application field correlation.

16. The system of claim 10 wherein the device tracker module is configured to perform matching processes to obtain the identity metadata by further performing determining whether the at least one packet relates to a dual-stack device or a device having more than one IP address based on the matching.

17. The system of claim 1 further comprising a state manager for determining the state of the device.

18. The system of claim 17 wherein the state manager is configured to:
initiate an idle timer and a timeout timer for the device;
update the state of the device to idle if the idle timer reaches a threshold; and
update the state of the device to deleted if the timeout timer reaches a threshold, otherwise returning the state of the device to active.

* * * * *